United States Patent
Ko et al.

(10) Patent No.: US 11,951,938 B2
(45) Date of Patent: Apr. 9, 2024

(54) STEERING WHEEL LOCKING CONTROL APPARATUS AND METHOD

(71) Applicant: HYUNDAI MOBIS CO., LTD., Seoul (KR)

(72) Inventors: Jung Suk Ko, Yongin-si (KR); Sung Ho Jang, Yongin-si (KR); Seung Young Park, Yongin-si (KR); Hyeon Hee Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 315 days.

(21) Appl. No.: 17/471,106

(22) Filed: Sep. 9, 2021

(65) Prior Publication Data

US 2023/0009437 A1   Jan. 12, 2023

(30) Foreign Application Priority Data

Jun. 30, 2021   (KR) .................. 10-2021-0085519

(51) Int. Cl.
*B60R 25/02* (2013.01)
*B60R 25/0215* (2013.01)
*B62D 5/04* (2006.01)

(52) U.S. Cl.
CPC .......... *B60R 25/0215* (2013.01); *B62D 5/046* (2013.01)

(58) Field of Classification Search
CPC .... B60R 25/0215; B62D 5/046; B62D 6/008; B62D 5/04; B62D 5/0457; B62D 5/0463; H02P 25/18; H02P 27/06
See application file for complete search history.

(56) References Cited

U.S. PATENT DOCUMENTS

| 8,499,885 B1* | 8/2013 | Satou ........................ H02P 6/12 318/434 |
| 2009/0294209 A1* | 12/2009 | Bluhm ..................... B62D 5/04 180/446 |
| 2009/0308683 A1* | 12/2009 | Suzuki ................. B62D 5/0466 318/563 |
| 2013/0257328 A1* | 10/2013 | Arai ...................... H02P 29/032 318/400.22 |
| 2020/0321902 A1* | 10/2020 | Kozawa ............... B62D 5/0481 |

FOREIGN PATENT DOCUMENTS

| CN | 103208954 A | * | 7/2013 | ............. B62D 5/046 |
| CN | 205737401 U | * | 11/2016 | |
| DE | 11-2020-001733 | | 1/2022 | |
| DE | 11-2020-001736 | | 1/2022 | |
| FR | 2931753 A1 | * | 12/2009 | ........... B60R 25/021 |

(Continued)

OTHER PUBLICATIONS

Korean Office Action dated Jan. 6, 2023 issued in KR 10-2021-0085519.

(Continued)

*Primary Examiner* — Hung Q Nguyen
(74) *Attorney, Agent, or Firm* — DLA Piper LLP (US)

(57) ABSTRACT

A steering wheel locking control apparatus may include: a power supply switch configured to receive power from a battery when an ignition switch of a vehicle is turned off; and a switch unit connected to a motor, turned on when power is received through the power supply switch, and configured to lock a steering wheel through a closed circuit formed by shorting phases of the motor.

18 Claims, 4 Drawing Sheets

(56) References Cited

FOREIGN PATENT DOCUMENTS

| | | | | |
|---|---|---|---|---|
| JP | 2004-330840 | | 11/2004 | |
| JP | 2004330840 A | * | 11/2004 | |
| JP | 2008-080968 | | 4/2008 | |
| JP | 2013198202 A | * | 9/2013 | ........... B62D 5/0463 |
| JP | 2017-114448 | | 6/2017 | |
| JP | 2018144628 A | * | 9/2018 | |
| KR | 2011-0007766 | | 1/2011 | |
| KR | 2017-0056745 | | 5/2017 | |
| KR | 10-1987703 | | 6/2019 | |
| WO | WO-9732220 A1 | * | 9/1997 | ........... G01R 31/007 |
| WO | WO-2010084623 A1 | * | 7/2010 | ........... B62D 5/0469 |

OTHER PUBLICATIONS

English Language Abstract of KR 2011-0007766 published Jan. 25, 2011.

English Language Abstract of KR 2017-0056745 published May 24, 2017.

German Office Action dated Jun. 2, 2022 issued in DE 102021123899.4.

"Pullup-, Pulldown-Widerstand Openkollektor—Wired-OR-Latchup-Effect", https://www.elekronik-kompendium.de/public/schaerer/pullr.htm, Jun. 12, 2021.

English Language Abstract of DE 11-2020-001733 published Jan. 5, 2022.

English Language Abstract of DE 11-2020-001736 published Jan. 5, 2022.

English Language Abstract of JP 2004-330840 published Nov. 24, 2004.

English Language Abstract of JP 2008-080968 published Apr. 10, 2008.

English Language Abstract of JP 2017-114448 published Jun. 29, 2017.

\* cited by examiner

STEERING WHEEL LOCKING CONTROL APPARATUS AND METHOD

CROSS-REFERENCE TO RELATED APPLICATION

This application claims priority from and the benefit of Korean Patent Application No. 10-2021-0085519, filed on Jun. 30, 2021, which is hereby incorporated by reference for all purposes as if set forth herein.

BACKGROUND

Field

Exemplary embodiments of the present disclosure relate to a steering wheel locking control apparatus and method, and more particularly, to a steering wheel locking control apparatus and method which can prevent a steering wheel from freewheeling, when an ignition switch of a vehicle is turned off.

Discussion of the Background

An SBW (Steer-By-Wire) system refers to a steering system in which the mechanical connection between a steering wheel and a wheel of a vehicle is removed. The SBW system receives a rotation signal of the steering wheel through an ECU (Electronic Control Unit), and steers the vehicle by operating a steering assist motor connected to the wheel, based on the received rotation signal.

Since the SBW system excludes the mechanical connection structure of an existing steering system, the SBW system can increase the degree of freedom in layout according to the configuration of a steering system, improve fuel efficiency, and remove disturbances which are reversely inputted from the wheels.

When the ignition switch of the vehicle having the SBW system applied thereto is turned off, the ECU is not driven. Thus, the steering wheel is not locked but freewheels. In this case, when a driver stands up holding the steering wheel, the driver may be exposed to a risk of injury.

Thus, there is a need for the development of technology capable of preventing a steering wheel from freewheeling, when the ignition switch of a vehicle is turned off.

The related art of the present disclosure is disclosed in Korean Patent No. 10-1987703 published on Jun. 11, 2019 and entitled 'Steer-By-Wire System and Control Method Thereof'.

SUMMARY

Various embodiments are directed to a steering wheel locking control apparatus and method which can prevent a steering wheel from freewheeling, when an ignition switch of a vehicle is turned off.

The problems to be solved by the present disclosure are not limited to the above-mentioned problems, and the other unmentioned problems will be clearly understood from the following description by those skilled in the art.

In an embodiment, a steering wheel locking control apparatus may include: a power supply switch configured to receive power from a battery when an ignition switch of a vehicle is turned off; and a switch unit connected to a motor, turned on when power is received through the power supply switch, and configured to lock a steering wheel through a closed circuit formed by shorting phases of the motor.

When the ignition switch of the vehicle is turned off, the power supply switch is turned on in response to a low signal applied thereto, the low signal being set as a default by a pull-down resistor within an ECU (Electronic Control Unit).

The power supply switch may be implemented as an EFT (Electric Field Transistor) which has a gate electrically connected to an MCU (Micro Controller Unit) and a source electrically connected to a line at the battery, and turned on when the low signal set by the pull-down resistor within the ECU is applied to the gate.

The switch unit may lock the steering wheel by applying reaction force torque to the steering wheel, the reaction force torque being caused by a counter electromotive force generated by the motor in the closed circuit, according to a manipulation of the steering wheel.

The switch unit may include one or more switches each electrically connected to the corresponding phase of the motor.

The switch unit may include three switches which are electrically connected to the respective phases of the motor. The three switches may be each implemented as an EFT which has a gate electrically connected to a line of the power supply switch, a drain electrically connected to the corresponding phase of the motor, and a source connected to the ground, and turned on to form the closed circuit, when power is received through the power supply switch.

The switch unit may include two switches configured to electrically connect the phases of the motor. The two switches may be electrically connected to each other, and turned on to form the closed circuit, when power is received through the power supply switch.

The steering wheel locking control apparatus may further include a protection circuit unit configured to control the switch unit not to operate regardless of the operation of the power supply switch, when a control signal according to the turn-on of the ignition switch of the vehicle is received from the MCU.

The protection circuit unit may be implemented as an EFT which has a gate electrically connected to the MCU, a drain electrically connected to a line at the battery, and a source connected to the ground.

In an embodiment, a steering wheel locking control method may include: receiving power from a battery through a power supply switch which is turned on when an ignition switch of a vehicle is turned off; and locking a steering wheel through a closed circuit formed by shorting phases of a motor, as a switch unit connected to the motor is turned on when power is received through the power supply switch.

In the receiving of the power from the battery, when the ignition switch of the vehicle is turned off, the power supply switch may be turned on in response to a low signal applied thereto, the low signal being set as a default by a pull-down resistor within an ECU.

In the locking of the steering wheel, the switch unit may include three switches which are electrically connected to the respective phases of the motor, wherein the three switches are each implemented as an EFT which has a gate electrically connected to a line of the power supply switch, a drain electrically connected to the corresponding phase of the motor, and a source connected to the ground, and turned on to form the closed circuit, when power is received through the power supply switch.

In the locking of the steering wheel, the switch unit may include two switches configured to electrically connect the phases of the motor, wherein the two switches are electrically connected to each other, and turned on to form the closed circuit when power is received through the power supply switch.

The steering wheel locking control method may further include controlling, by a protection circuit unit, the switch unit not to operate regardless of the operation of the power supply switch, when a control signal according to the turn-on of the ignition switch of the vehicle is received from an MCU.

In accordance with the embodiments of the present disclosure, the steering wheel locking control apparatus and method may prevent the steering wheel from freewheeling, when the ignition switch of the vehicle is turned off. Thus, when a driver stands up holding the steering wheel or strengthens his/her grip on the steering wheel, the steering wheel locking control apparatus and method may prevent the vehicle from being rapidly steered, thereby protecting the driver from a risk of injury.

The steering wheel locking control apparatus and method may reduce the manufacturing cost, compared to a system having a mechanical device (e.g. a key lock system) applied thereto.

The effects of the present disclosure are not limited to the above-described effects, but may include various effects from the following contents to be described below, as long as the contents are obvious to those skilled in the art.

DETAILED DESCRIPTION OF THE ILLUSTRATED EMBODIMENTS

Figure 1:
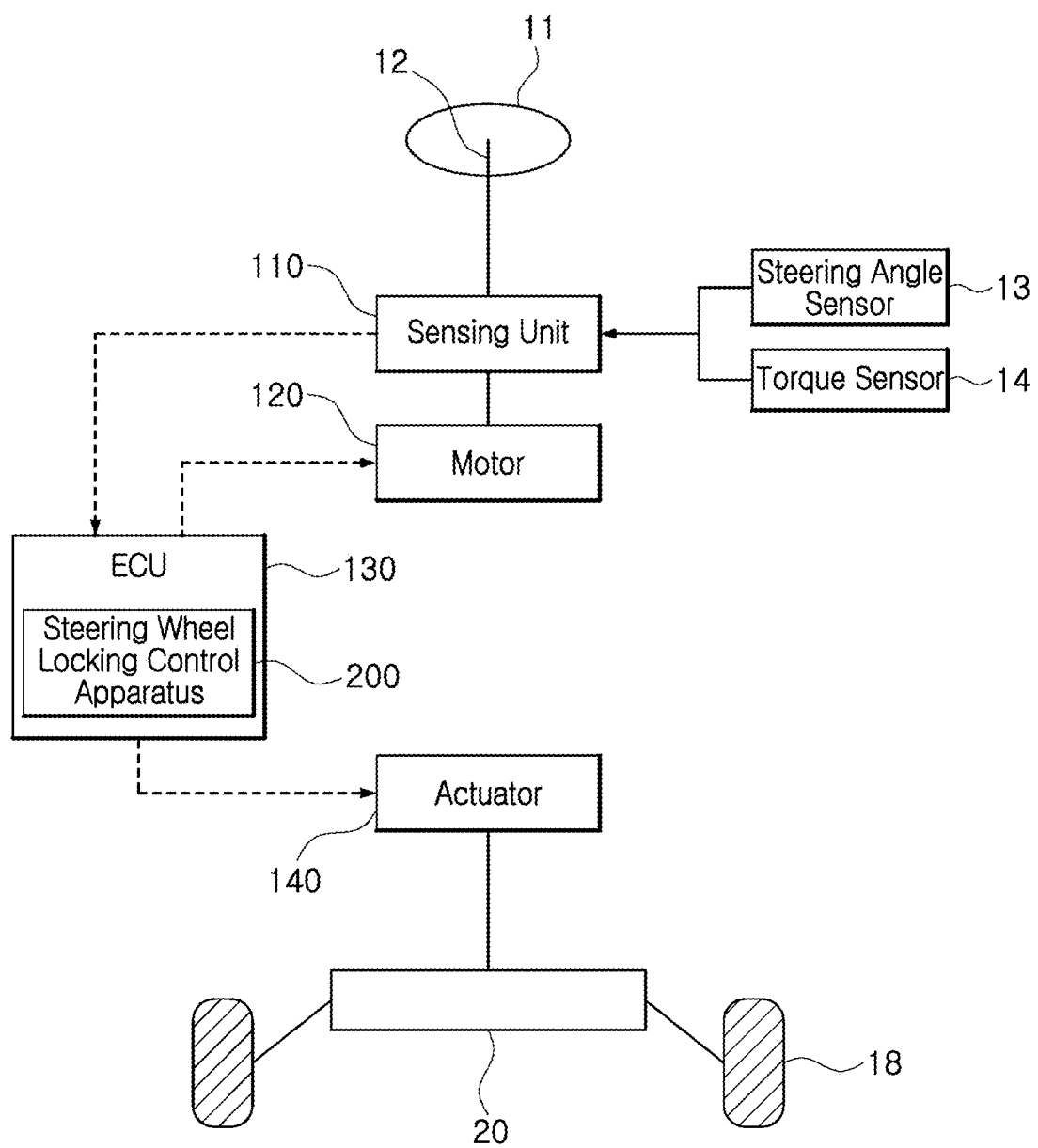
FIG. 1 is a diagram illustrating a schematic configuration of an SBW (Steer-By-Wire) system in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a steering wheel locking control apparatus and method will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

FIG. 1 is a diagram illustrating a schematic configuration of an SBW (Steer-By-Wire) system in accordance with an embodiment of the present disclosure.

Referring to FIG. 1, the SBW system in accordance with the embodiment of the present disclosure may include a steering wheel 11, a steering shaft 12 configured to support the steering wheel 11, a motor 120 mounted on one side of the steering shaft 12 and driven by an ECU (Electronic Control Unit) 130, a sensing unit 110 located on one side of the steering shaft 12, the motor 120 or a rack bar 20, the ECU 130, and one or more actuators 140 each configured to steer a front wheel 18 of a vehicle according to a control signal of the ECU 130. The motor 120 and the actuator 140 may be connected to each other through communication such as CAN, FlexRay or Ethernet.

Such an SBW system has no mechanical connection between the steering wheel 11 and the rack bar 20. The motor 120 capable of applying a reaction force to the steering wheel 11 is coupled to a column connected to the steering wheel 11. The rack bar 20 is coupled to the actuator 140 for controlling the front wheel 18. The actuator 140 is coupled to a steering motor (not illustrated) for moving the rack bar 20 to control the front wheel 18.

The sensing unit 110 may receive sensing information from one or more of a steering angle sensor 13 and a torque sensor 14, or include the steering angle sensor 13 and the torque sensor 14. The steering angle sensor 13 may sense a change in rotation of the steering shaft 12 by a driver's manipulation on the steering wheel 11, and the torque sensor 14 may be installed on one side of the steering shaft 12 and sense torque outputted from the motor 120.

When the ignition switch of the vehicle is turned off, the ECU 130 of the SBW system is not driven. Thus, the steering wheel 11 freewheels. In this case, the driver may be exposed to a risk of injury. Therefore, there is a need for a device capable of preventing the steering wheel 11 from freewheeling, when the ignition switch of the vehicle is turned off.

Thus, the ECU 130 may include a steering wheel locking control apparatus 200 that locks the steering wheel 11 by shorting (controlling) three phases of the motor 120, when the ignition switch of the vehicle is turned off.

The steering wheel locking control apparatus 200 may lock the steering wheel 11 by applying reaction force torque, caused by a counter electromotive force generated through the motor 120, to the steering wheel 11, when the ignition switch of the vehicle is turned off. That is, the steering wheel locking control apparatus 200 may prevent the steering wheel 11 from freewheeling, when the ignition switch of the vehicle is turned off. This operation may prevent the vehicle from being rapidly steered when the driver stands up holding the steering wheel or strengthens his/her grip on the steering wheel 11, thereby protecting the driver from a risk of injury.

Such a steering wheel locking control apparatus 200 may be implemented as an integrated control device installed in the vehicle or a partial module of the ECU 130.

The integrated control device of the vehicle or the ECU 130 may include a processor, a storage device such as a memory, and a computer program capable of performing a specific function, and the steering wheel locking control apparatus 200 may be implemented as a software module capable of performing a unique function.

The detailed descriptions of the steering wheel locking control apparatus 200 will be described with reference to FIG. 2.

The ECU 130 controls the operation of the motor 120, and controls an output of the actuator 140 to steer the front wheel 18, thereby steering the vehicle.

In the embodiment of the present disclosure, one ECU 130 is installed. However, the ECU 130 may be divided into a first ECU for controlling the motor 120 and a second ECU for controlling the actuator 140. In this case, the first ECU may control the operation of the motor 120, and the second ECU may control an output of the actuator 140 configured to steer the front wheel 18 of the vehicle.

The motor 120 gives a proper steering feel to the driver by generating a force in the opposite direction of the steering wheel 11, when the driver operates the steering wheel 11, and a current for generating proper reaction force torque is provided to the motor 120 for generating a steering feel.

The motor 120 may include a plurality of wirings. Based on the sensing information from the sensing unit 110, the motor 120 may be rotated to generate a counter electromotive force.

The motor 120 is installed on one side of the steering shaft 12, and serves to give a proper steering feel to a driver by generating reaction force torque against the driver's steering force applied to the steering wheel 11 according to a control signal applied from the ECU 130.

Such a motor 120 may include one or more of a 3-phase motor and a 5-phase motor. However, the motor 120 is not limited thereto, but may include any motors as long as the motors can provide a reaction force to the steering wheel 11.

FIG. 1 illustrates an R-EPS (Rack-EPS) as the SBW system. However, a hydraulic EPS, a CEPS (Column EPS), a DP-EPS (Dual Pinion-EPS) and the like may also be applied.

Figure 2:
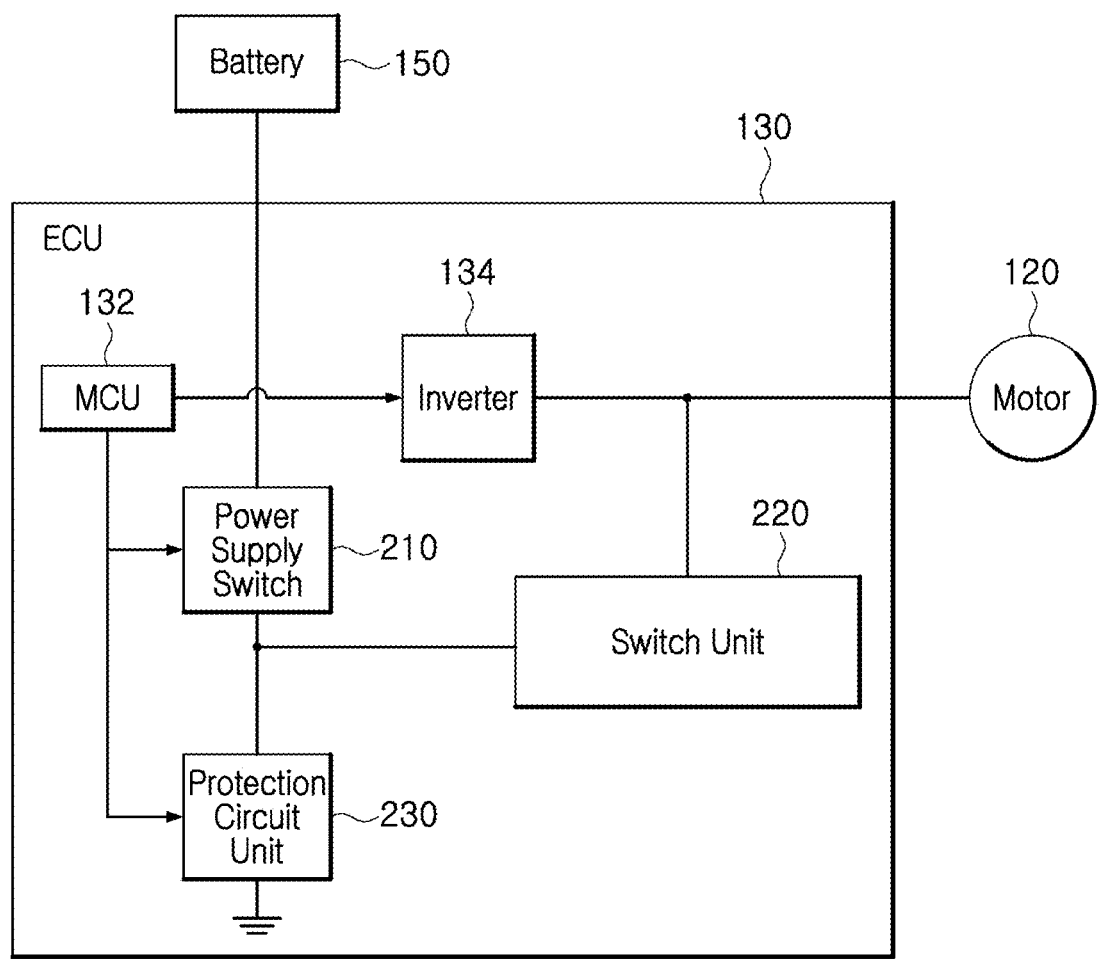
FIG. 2 is a diagram for describing a steering wheel locking control apparatus in accordance with an embodiment of the present disclosure.
Figure 3:
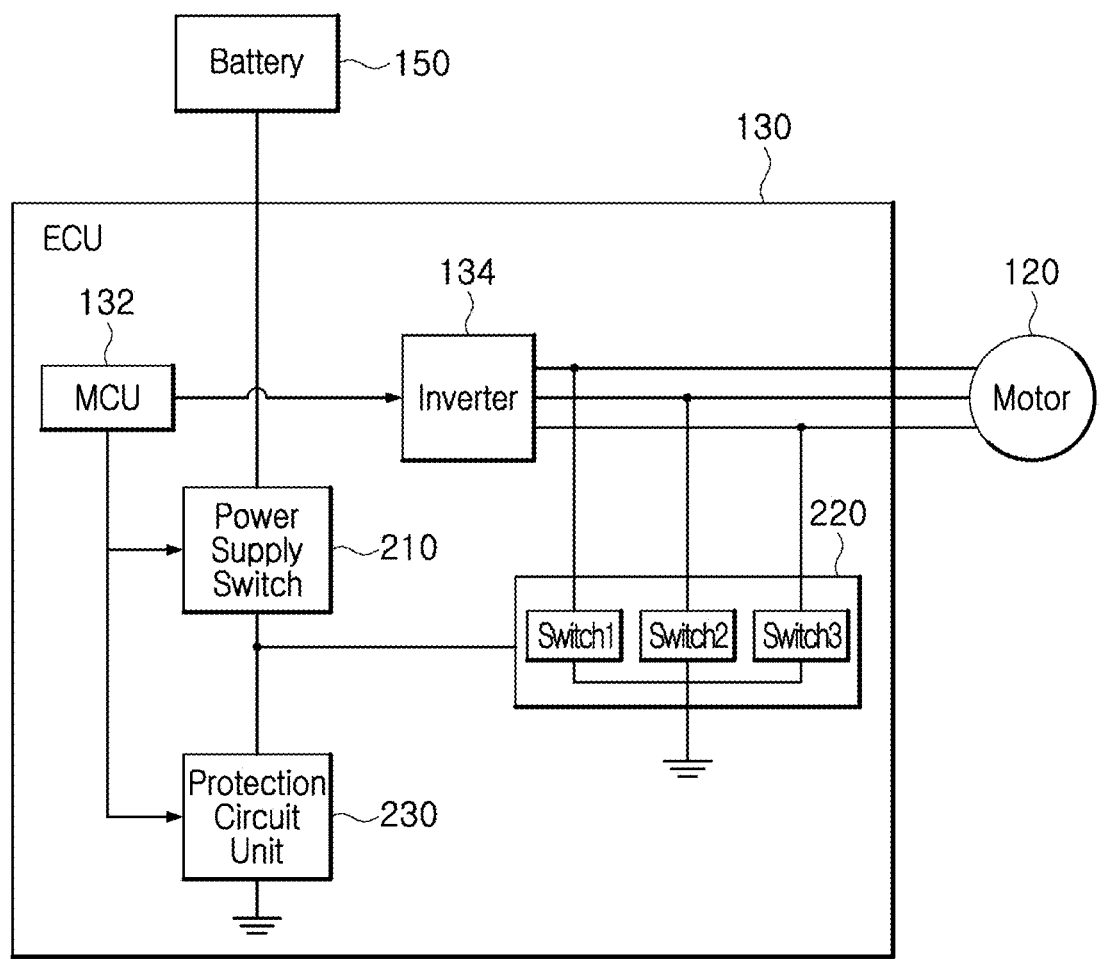
FIG. 3 is a diagram for describing a switch unit in accordance with an embodiment of the present disclosure.
Figure 4:
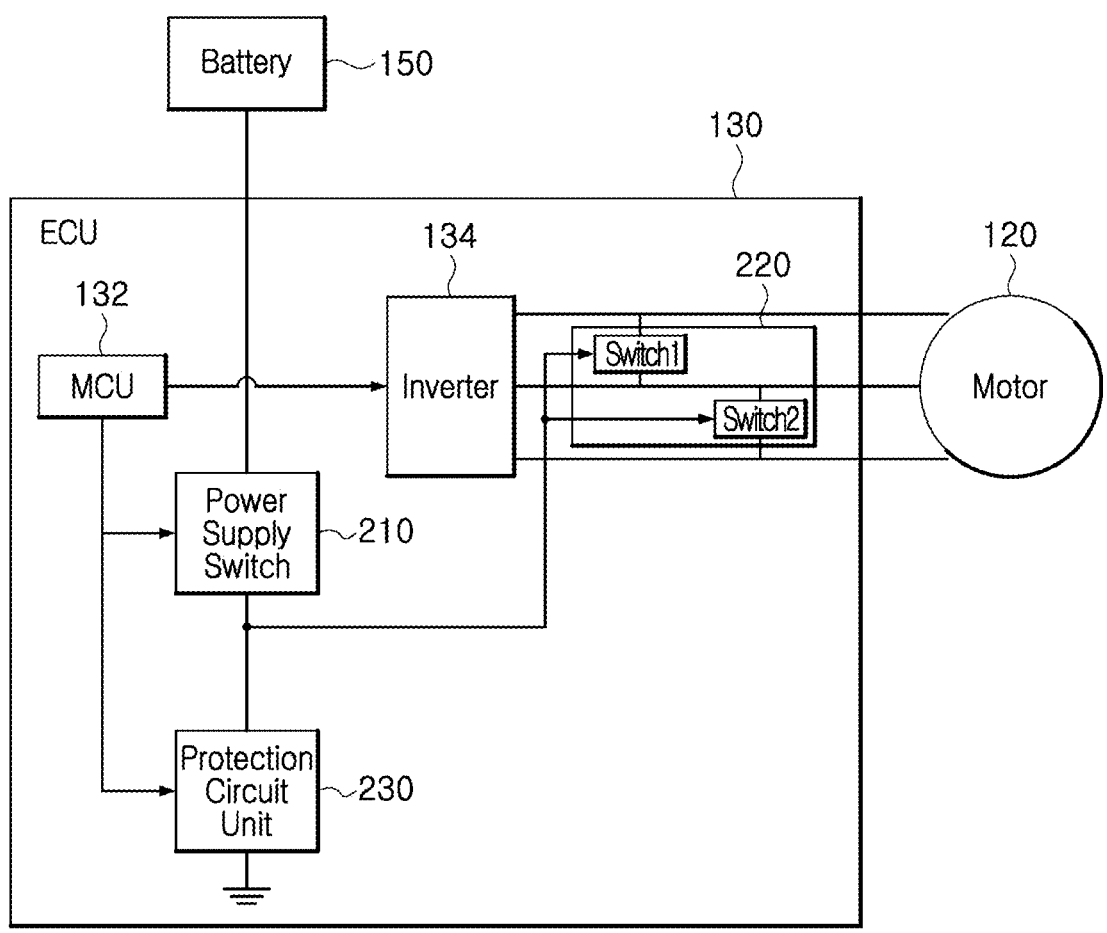
FIG. 4 is a diagram for describing a switch unit in accordance with another embodiment of the present disclosure.

FIG. 2 is a diagram for describing a steering wheel locking control apparatus in accordance with an embodiment of the present disclosure, FIG. 3 is a diagram for describing a switch unit in accordance with the embodiment of the present disclosure, and FIG. 4 is a diagram for describing a switch unit in accordance with another embodiment of the present disclosure.

Referring to FIG. 2, the steering wheel locking control apparatus 200 in accordance with the embodiment of the present disclosure includes an MCU (Micro Controller Unit) 132, a power supply switch 210, a switch unit 220 and a protection circuit unit 230.

A battery 150 supplies power to electronic control devices installed in the vehicle. In general, the battery 150 may supply DC power of 12 V to 24 V.

In the present disclosure, the battery 150 may serve as a regular power supply, and supply power to the steering wheel locking control apparatus 200 when the ignition switch of the vehicle is turned off.

The power supply switch 210 is turned on to receive power from the battery 150, when the ignition switch of the vehicle is turned off.

When the ignition switch of the vehicle is turned off, no power may be supplied to the MCU 132, and the power supply switch 210 may be turned on by a low signal received from the ECU 130, the low signal being set by a pull-down resistor within the ECU 130. The ECU pull-down resistor may be a resistor set as the default between the MCU 132 and the power supply switch 210.

When the ignition switch of the vehicle is turned on, power may be supplied to the MCU 132, and the power supply switch 210 may be turned on or off according to a control signal from the MCU 132.

Such a power supply switch 210 may be implemented as various switches such as a PFET (P-channel Field Effect Transistor), NFET (N-channel FET), transistor and relay. In the present embodiment, however, the case in which the power supply switch 210 is implemented as a PFET will be taken as an example for description. That is, the power supply switch 210 may be a PFET which has a gate electrically connected to the MCU 132 and a source electrically connected to a line at the battery 150.

When the ignition switch of the vehicle is turned on, power is supplied to the MCU 132. When power is supplied to the MCU 132, the MCU 132 may output a control signal at a high or low level, the control signal being applied to control the on/off of the power supply switch 210. That is, while the ignition switch of the vehicle is turned on, the MCU 132 may control the on/off of the power supply switch 210 according to a driving/fail-safe condition. Furthermore, when the ignition switch of the vehicle is turned off, no power is supplied to the MCU 132. Thus, a gate driver (not illustrated) configured to control the operation of the motor 120 is turned off. Therefore, an inverter 134 is turned off, and the motor 120 is not controlled. Furthermore, since power is supplied to the MCU 132 while the ignition switch of the vehicle is turned on, the MCU 132 may control the on/off of the power supply switch 210 to control the motor 120, according to a condition (on/off or fail-safe condition).

The switch unit 220 may be connected to the motor 120. When receiving power through the power supply switch 210, the switch unit 220 may be turned on to short the phases of the motor 120. Then, a closed circuit may be formed to lock the steering wheel 11. At this time, the switch unit 220 may apply reaction force torque to the steering wheel 11, in order to lock the steering wheel 11. The reaction force torque may be caused by a counter electromotive force which is generated by the motor 120 in the closed circuit, according to a manipulation of the steering wheel 11.

Such a switch unit 220 may include one or more switches which are electrically connected to the respective phases of the motor 120.

For example, as illustrated in FIG. 3, the switch unit 220 may include three switches connected in parallel between the inverter 134 and the respective phases of the motor 120, e.g. a first switch, a second switch and a third switch. At this time, the switch unit 220 may be implemented as various switches such as a PFET, NFET, transistor and relay. In the present embodiment, however, the case in which the switch unit 220 is implemented as an NFET will be taken as an example for description. That is, each of the switches of the switch unit 220 may be implemented as an EFT which has a gate electrically connected to a line of the power supply switch 210, a drain electrically connected to the corresponding phase of the motor 120, and a source connected to the ground GND. At this time, each of the switches of the switch unit 220 may be implemented as an NFET.

For example, when the switch unit 220 includes a first switch NFET1, a second switch NFET2 and a third switch NFET3, the first switch NFET1 may be electrically connected to the a-phase of the 3-phase motor, the second switch NFET2 may be electrically connected to the b-phase of the 3-phase motor, and the third switch NEFT3 may be electrically connected to the c-phase of the 3-phase motor.

When receiving power through the power supply switch 210, the switches of the switch unit 220 may be turned on to short the respective phases of the motor 120 to the ground, thereby forming a 3-phase closed circuit. The 3-phase closed circuit may provide a current to each phase of the motor 120, based on a counter electromotive force generated by the motor 120 according to a manipulation of the steering wheel 11.

When the motor 120 is rotated by the manipulation of the steering wheel 11 in the 3-phase closed circuit formed by the turn-on of the switch unit 220, the motor 120 may generate a counter electromotive force. At this time, the counter electromotive force may operate as a power supply which is connected to each of the wirings of the motor 120 and provides a current to each of the wirings. When the current is provided to each of the wirings, the motor 120 may generate reaction force torque. The motor 120 may apply the generated reaction force torque to the steering wheel 11. The motor 120 may lock the steering wheel 11 by using the reaction force torque, such that the steering wheel 11 is not turned. At this time, the reaction force torque to lock the steering wheel 11 may be generated based on a reduction ratio (the gear ratio of a column reducer) and torque generated by the counter electromotive force of the motor 120. For example, the reaction force torque to lock the steering wheel 11 may be generated by the product of the reduction ratio (the gear ratio of the column reducer) and the torque generated by the counter electromotive force of the motor 120.

As illustrated in FIG. 4, the switch unit 220 may include two switches which electrically connect the phases of the motor 120. At this time, the two switches (e.g. the first switch and the second switch) may be electrically connected to each other. When receiving power through the power supply switch 210, the two switches may be turned on to form a closed circuit. Such a switch unit 220 may be implemented as various switches such as a PFET, NFET, transistor and relay.

For example, when the switch unit 220 includes a first switch and a second switch, the first switch may be electrically connected between the a-phase and b-phase of the 3-phase motor 120, and the second switch may be electrically connected between the b-phase and c-phase of the 3-phase motor 120. In this way, the first and second switches may be electrically connected to each other.

When receiving power from the power supply switch 210, the first and second switches of the switch unit 220 may be turned on and electrically connected to each other, and the switch unit 220 may form a 3-phase closed circuit through the electrical connection. The 3-phase closed circuit may provide a current to each phase of the motor 120, based on a counter electromotive force generated by the motor 120 according to a manipulation of the steering wheel 11.

When the motor 120 is rotated by the manipulation of the steering wheel 11 in the 3-phase closed circuit formed by the turn-on of the switch unit 220, the motor 120 may generate a counter electromotive force. At this time, the counter electromotive force may operate as a power supply which is connected to each of the wirings of the motor 120 and provides a current to each of the wirings. When the current is provided to each of the wirings, the motor 120 may generate reaction force torque. The motor 120 may apply the generated reaction force torque to the steering wheel 11. The motor 120 may lock the steering wheel 11 by using the reaction force torque, such that the steering wheel 11 is not turned. At this time, the reaction force torque to lock the steering wheel 11 may be generated based on a reduction ratio (the gear ratio of a column reducer) and torque generated by the counter electromotive force of the motor 120. For example, the reaction force torque to lock the steering wheel 11 may be generated by the product of the reduction ratio (the gear ratio of the column reducer) and the torque generated by the counter electromotive force of the motor 120.

When receiving a control signal according to the turn-on of the ignition switch of the vehicle from the MCU 132, the protection circuit unit 230 may control the switch unit 220 not to operate regardless of the operation of the power supply switch 210. At this time, the protection circuit unit 230 may be implemented as various switches such as a PFET, NFET, transistor and relay. In the present embodiment, however, the case in which the protection circuit unit 230 is implemented as an NFET will be taken as an example for description.

The protection circuit unit 230 may be an FET which has a gate electrically connected to the MCU 132, a drain electrically connected to a line at the battery 150, and a source electrically connected to the ground. At this time, the protection circuit unit 230 may be implemented as an NFET.

When the ignition switch of the vehicle is turned off, no power is supplied to the MCU 132, such that the MCU 132 is not operated. However, when the ignition switch of the vehicle is turned on, power may be supplied to the MCU 132, such that the MCU 132 outputs a control signal to control the operations of the power supply switch 210 and the protection circuit unit 230. The control signal may include a high signal and a low signal.

When the MCU 132 outputs a high signal while the ignition switch of the vehicle is turned on, the power supply switch 210 is turned off, and the protection circuit unit 230 is turned on. Thus, the switch unit 220 is not operated. That is, when receiving the high signal from the MCU 132, the protection circuit unit 230 may be turned on to control the steering wheel 11 not to be locked while the vehicle is traveling.

As such, the steering wheel locking control apparatus and method in accordance with the embodiment of the present disclosure may prevent the steering wheel from freewheeling, when the ignition switch of the vehicle is turned off. Thus, when a driver stands up holding the steering wheel or strengthens his/her grip on the steering wheel, the steering wheel locking control apparatus and method may prevent the vehicle from being rapidly steered, thereby protecting the driver from a risk of injury.

The steering wheel locking control apparatus and method in accordance with the embodiment of the present disclosure may reduce the manufacturing cost, compared to a system having a mechanical device (e.g. a key lock system) applied thereto.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A steering wheel locking control apparatus comprising:
a power supply switch configured to receive power from a battery when an ignition switch of a vehicle is turned off;
a switch unit comprising one or more switches connected to a motor, the switch unit being configured to be turned on in response to power being received through the power supply switch, and configured to lock a steering wheel through a closed circuit formed by shorting phases of the motor; and
a protection circuit configured to control the one or more switches of the switch unit not to operate, regardless of the operation of the power supply switch, in response to a control signal according to turn-on of the ignition switch of the vehicle being received from an MCU.

2. The steering wheel locking control apparatus of claim 1, wherein in response to the ignition switch of the vehicle being turned off, the power supply switch is turned on in response to a low signal applied thereto, the low signal being set as a default by a pull-down resistor within an ECU (Electronic Control Unit).

3. The steering wheel locking control apparatus of claim 2, wherein the power supply switch comprises an EFT (Electric Field Transistor) including a gate electrically connected to an MCU (Micro Controller Unit) and a source electrically connected to a line at the battery, and configured to be turned on when the low signal set by the pull-down resistor within the ECU is applied to the gate.

4. The steering wheel locking control apparatus of claim 1, wherein the one or more switches of the switch unit are configured to lock the steering wheel by applying reaction force torque to the steering wheel, the reaction force torque being caused by a counter electromotive force generated by the motor in the closed circuit, according to a manipulation of the steering wheel.

5. The steering wheel locking control apparatus of claim 1, wherein the one or more switches of the switch unit are each electrically connected to a corresponding phase of the motor.

6. The steering wheel locking control apparatus of claim 5, wherein the switch unit comprises three switches which are electrically connected to respective phases of the motor, wherein the three switches each comprise an EFT including a gate electrically connected to a line of the power supply switch, a drain electrically connected to the corresponding phase of the motor, and a source connected to the ground, and configured to be turned on to form the closed circuit in response to power being received through the power supply switch.

7. The steering wheel locking control apparatus of claim 5, wherein the switch unit comprises two switches configured to electrically connect the phases of the motor, wherein the two switches are electrically connected to each other and configured to be turned on to form the closed circuit in response to power being received through the power supply switch.

8. The steering wheel locking control apparatus of claim 1, wherein the protection circuit comprises an EFT including a gate electrically connected to the MCU, a drain electrically connected to a line at the battery, and a source connected to the ground.

9. A steering wheel locking control method comprising:
receiving power from a battery through a power supply switch which is turned on when an ignition switch of a vehicle is turned off;
locking a steering wheel through a closed circuit formed by shorting phases of a motor, as one or more switches of a switch unit connected to the motor are turned on when power is received through the power supply switch; and
controlling, by a protection circuit, the one or more switches of the switch unit not to operate, regardless of the operation of the power supply switch, when a control signal according to turn-on of the ignition switch of the vehicle is received from an MCU.

10. The steering wheel locking control method of claim 9, wherein in the receiving of the power from the battery, when the ignition switch of the vehicle is turned off, the power supply switch is turned on in response to a low signal applied thereto, the low signal being set as a default by a pull-down resistor within an ECU.

11. The steering wheel locking control method of claim 9, wherein in the locking of the steering wheel, the one or more switches of the switch unit lock the steering wheel by applying reaction force torque to the steering wheel, the reaction force torque being caused by a counter electromotive force generated by the motor in the closed circuit, according to an operation of the steering wheel.

12. The steering wheel locking control method of claim 9, wherein in the locking of the steering wheel, the switch unit comprises three switches which are electrically connected to respective phases of the motor, wherein the three switches each respectively comprise an EFT including a gate electrically connected to a line of the power supply switch, a drain electrically connected to the corresponding phase of the motor, and a source connected to the ground, and turned on to form the closed circuit when power is received through the power supply switch.

13. The steering wheel locking control method of claim 9, wherein in the locking of the steering wheel, the switch unit comprises two switches configured to electrically connect the phases of the motor, wherein the two switches are electrically connected to each other, and turned on to form the closed circuit when power is received through the power supply switch.

14. A steering wheel locking control apparatus comprising:
a power supply switch configured to receive power from a battery when an ignition switch of a vehicle is turned off; and
a switch unit comprising one or more switches connected to a motor, the switch unit being configured to be turned on in response to power being received through the power supply switch, and configured to lock a steering wheel through a closed circuit formed by shorting phases of the motor,
wherein in response to the ignition switch of the vehicle being turned off, the power supply switch is turned on in response to a low signal applied thereto, the low signal being set as a default by a pull-down resistor within an ECU (Electronic Control Unit), wherein the power supply switch comprises an EFT (Electric Field Transistor) including a gate electrically connected to an MCU (Micro Controller Unit) and a source electrically connected to a line at the battery, and configured to be turned on when the low signal set by the pull-down resistor within the ECU is applied to the gate.

15. The steering wheel locking control apparatus of claim 14, wherein the one or more switches of the switch unit are configured to lock the steering wheel by applying reaction force torque to the steering wheel, the reaction force torque being caused by a counter electromotive force generated by the motor in the closed circuit, according to a manipulation of the steering wheel.

16. The steering wheel locking control apparatus of claim 14, wherein the one or more switches of the switch unit are each electrically connected to a corresponding phase of the motor.

17. The steering wheel locking control apparatus of claim 16, wherein the switch unit comprises three switches which are electrically connected to respective phases of the motor, wherein the three switches each comprise an EFT including a gate electrically connected to a line of the power supply switch, a drain electrically connected to the corresponding phase of the motor, and a source connected to the ground, and configured to be turned on to form the closed circuit in response to power being received through the power supply switch.

18. The steering wheel locking control apparatus of claim 16, wherein the switch unit comprises two switches configured to electrically connect the phases of the motor, wherein the two switches are electrically connected to each other and configured to be turned on to form the closed circuit in response to power being received through the power supply switch.

* * * * *